Figure 1:
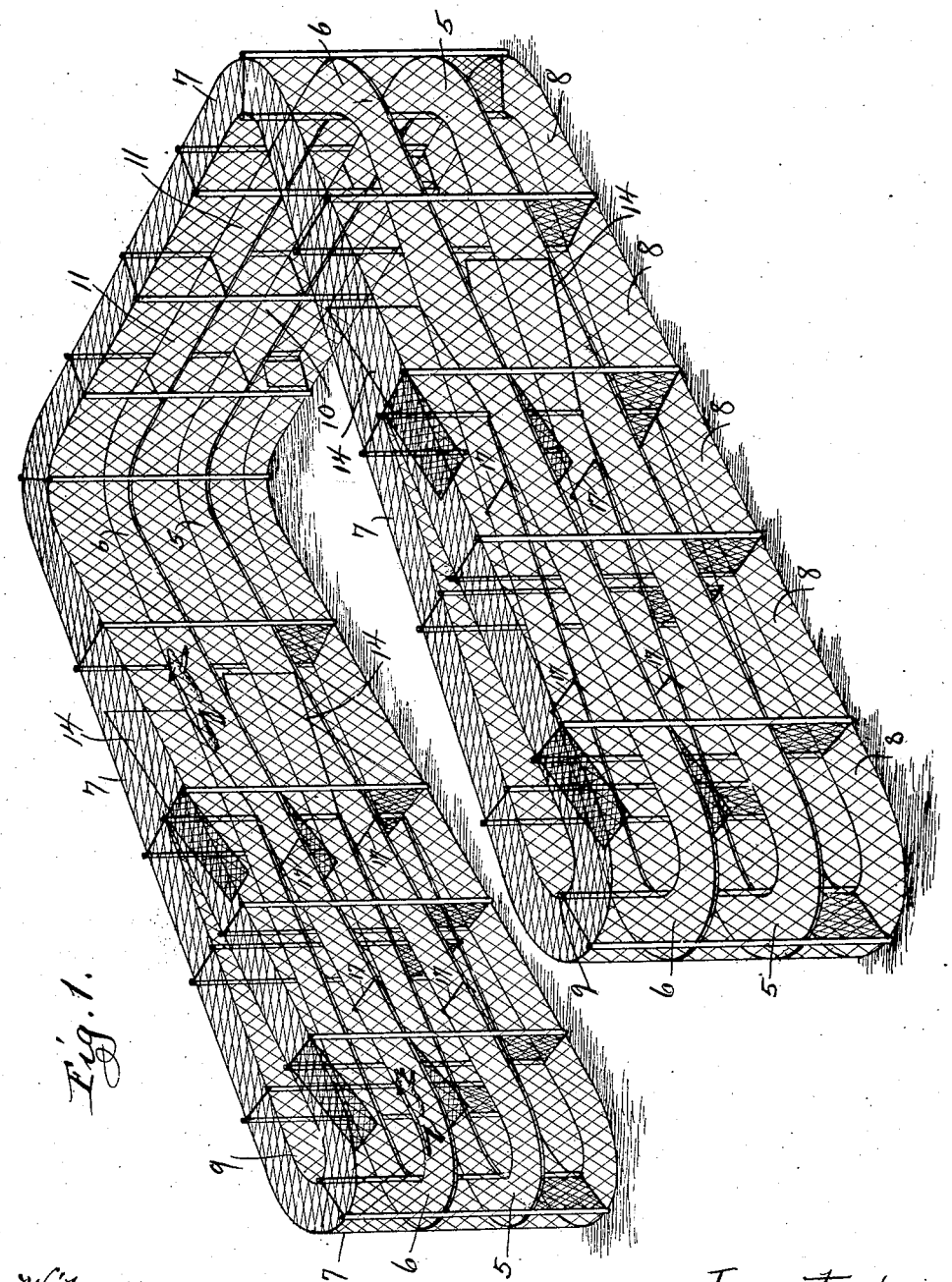

No. 855,670. PATENTED JUNE 4, 1907.
F. C. ROBERTS & H. J. TITUS.
LIVE ANIMAL RACE.
APPLICATION FILED MAR. 24, 1906.

2 SHEETS—SHEET 1.

Witnesses:

Inventors:
Ferdinand C. Roberts &
Hazen J. Titus
By R. J. Jacker
Atty.

No. 855,670. PATENTED JUNE 4, 1907.
F. C. ROBERTS & H. J. TITUS.
LIVE ANIMAL RACE.
APPLICATION FILED MAR. 24, 1906.
2 SHEETS—SHEET 2.
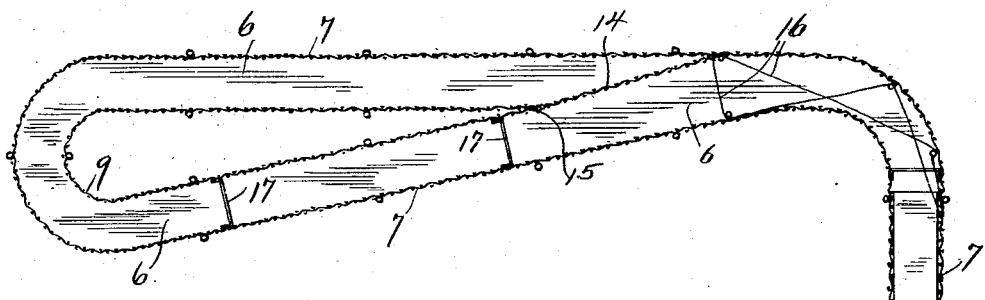
Fig. 2.
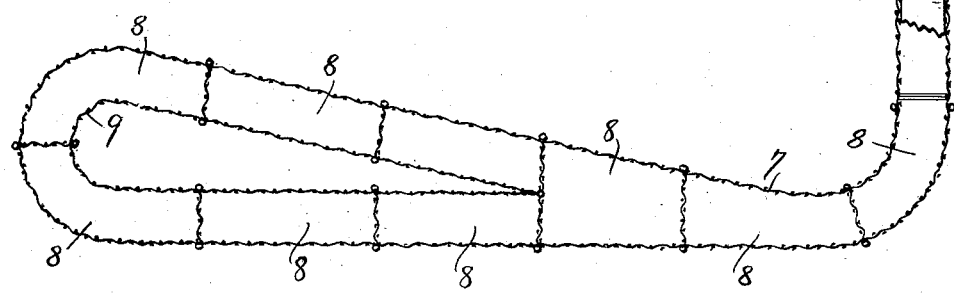
Fig. 3.
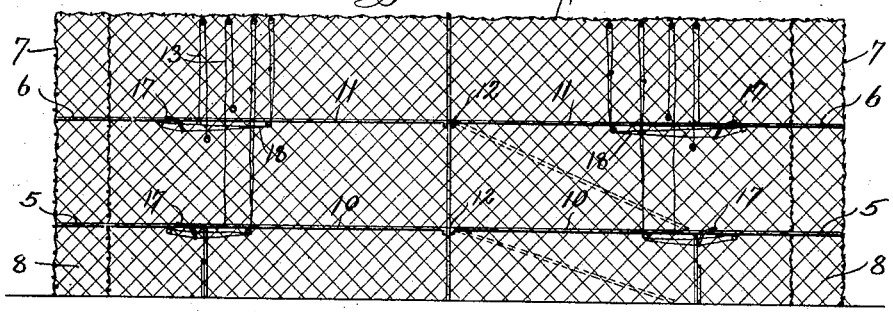
Witnesses:
Inventors:
Ferdinand C. Roberts and
Hazen J. Titus
By R. J. Jackler
Atty.
THE NORRIS PETERS CO., WASHINGTON, D. C.

UNITED STATES PATENT OFFICE.

FERDINAND C. ROBERTS, OF DETROIT, MICHIGAN, AND HAZEN J. TITUS, OF JACKSON, TENNESSEE.

LIVE-ANIMAL RACE.

No. 855,670.  Specification of Letters Patent.  Patented June 4, 1907.

Application filed March 24, 1906. Serial No. 307,932.

*To all whom it may concern:*

Be it known that we, FERDINAND C. ROBERTS and HAZEN J. TITUS, citizens of the United States, residing at Detroit, in the county of Wayne and State of Michigan, and at Jackson, in the county of Madison and State of Tennessee, respectively, have invented a new and useful Live-Animal Race, of which the following is a specification.

Our invention relates to an inclosed track or race for animals, and the objects of our improvements are, first, to provide as long a race as possible within a given space; second, to make a plurality of races one above another; third, to manipulate doors in different parts of the race to direct the animal in its course; fourth, to place tripping rods along in the race to delay the animal in its travel; fifth, to provide animal cages in connection with the race; sixth, to make an attractive, convenient and substantial construction and other objects to become apparent from the description to follow.

It is a well known fact that it is against the laws of nature and detrimental to the life and health of the creature to have animals in captivity and no means of allowing them to take plenty of exercise.

Our invention is designed to supply a means for allowing live animals to take plenty of exercise, in a U shape with a loop or return at each end of the U; the entire runway being inclosed with open wire work. Below the runway or race are arranged cages, for animals and at some convenient place along the race one or more lifting platforms are provided to cause the animal to travel up to, or down from, the elevated race as the case may be. We prefer to make two runways one above the other and substantially duplicates. Numerous doors and tripping rods to be manipulated from one station are provided along both runways.

To describe our invention so that others may understand it sufficiently to make and use the same we have illustrated it on the accompanying two sheets of drawings forming a part of this specification in which:—

Figure 1, is a perspective view of an animal race embodying our invention; Fig. 2, is a plan section of the same and Fig. 3, is an elevation of the operating station.

Similar reference characters refer to similar parts throughout the several views.

The race or runways 5 and 6 are made sufficiently wide to accommodate the animals intended to use the same and are inclosed by the open wire work 7, on the sides and top. The runway 6 is directly above runway 5 and serves as a top covering for the same, and below the runway 5 is arranged a series of cages 8 in which animals may be kept. For amusement or exhibition purposes the course of the runways is preferably of a U shape with the return loops 9 at each end, which as clearly shown in the drawings forms an endless course for each runway 5 and 6, the central portion of the course being traversed in both directions.

Between the loops 9, 9, and preferably along a straight portion of the runways 5 and 6 are provided the trap doors 10 and 11 hinged at 12 and arranged to be raised and lowered by means of ropes 13, the ends of which are within reach of the operator who is stationed adjacent to the doors outside the wire work 7. As seen in Fig. 3, the doors 10 are hinged at about the same height as the runway 5 and are arranged to be in either of two positions, that is, on a level with the runway 5 or with their free end down on a level with the floor of the cages 8; and the doors 11 are hinged at about the same height as the runway 6 and are arranged to be in either of two positions, that is on a level with the runway 6 or with their free ends down on a level with runway 5. These doors 10 and 11 are for the purpose of transferring an animal from the cage floor to the runway 5 or runway 6 and back again, the animal traveling up or down the doors as the case may be.

To insure the animal taking the desired course around the loops 9, 9, we prefer to hinge at 15 at the junction of the two branches of the loops 9, 9, a vertical door or gate 14 arranged to be moved into either of two positions, that is with its free end against one wire work vertical wall 7 or against the other wire work wall 7 by means of ropes 16 secured to the free end of the gate and the other ends of the ropes being within reach of the operator. It will be seen that when the free end of the gate 14 is in one of said positions the animal will be compelled to go around the loop 9 in one direction and when the gate 14 is in the other of said positions the animal will be compelled to go around the loop 9 in the other direction. We also prefer to arrange a plurality of doors along the runways which can be opened and closed by the operator at will. Such doors will normally be in an open position and are preferably hinged at the top as clearly shown in Fig. 1 of the drawing. In this manner either of the animals may be confined between two doors.

For amusement and exhibition purposes two animals of different species, for example a fox and a hound, may be confined on the runways, and the operator can manipulate the gates 14 and doors 10 and 11 as he desires, to have the chase continued or not. It is easily understood how two animals confined on the runways 5 and 6 can be separated by manipulating the doors 10 and 11. To further amuse the spectators and also to retard the travel of the pursuing animal, we prefer to provide a number of tripping rods 17 along on the runways 5 and 6, pivoted to said runways, and arranged to be turned up on their pivots, to form obstructions for the passing animal, by having connected thereto the ends of ropes 18 which have their other ends within reach of the operator. The tripping rods 17 normally lie, by force of gravity, down on the runways 5 and 6 which are preferably provided with grooves to receive said rods so that they lie entirely below the top surface of the runways.

While we have shown and described a construction which we at present believe to be the best, we wish to have it understood that numerous changes in the arrangement and construction of the device may be made without departing from the scope of the invention.

Having thus fully described our invention what we desire to secure by Letters Patent of the United States is:—

1. In a device of the class described, a runway provided with a return loop at either end.

2. In a device of the class described, a runway provided with a return loop at either end and a trap door to serve as an approach to and an exit from said runway.

3. In a device of the class described, a runway provided with a return loop at either end and with a gate hinged at the junction of said loop branches to determine the entrance to the loop.

4. In a device of the class described two runways arranged one above the other and provided with return loops at both ends and a trap door in one of said runways to serve as a connecting passage between said runways.

5. In a device of the class described, an inclosed elevated runway provided with a return loop at each end, a series of cages underneath said runway and a trap door in said runway to serve as a portion of the runway and as a connecting passage between said runway and said series of cages.

6. In a device of the class described a runway provided with a return loop at both ends, a pivoted tripping rod and means for moving said tripping rod into an operative position.

7. In a device of the class described, an inclosed runway provided with a return loop at either end.

8. In a device of the class described, a runway extended in substantially a U shape and provided with a return loop at either end.

9. In a device of the class described, an inclosed runway extended in substantially a U shape and provided with a return loop at either end.

In testimony whereof we have signed our names to this specification in presence of two subscribing witnesses this 14th day of March, 1906, at Chicago, Illinois.

FERDINAND C. ROBERTS.
HAZEN J. TITUS.

Witnesses:
F. T. LONERGAN,
R. J. JACKER.